J. HIRSHSTEIN.
COUPLING.
APPLICATION FILED JAN. 22, 1918.
1,304,979.
Patented May 27, 1919.
2 SHEETS—SHEET 2.
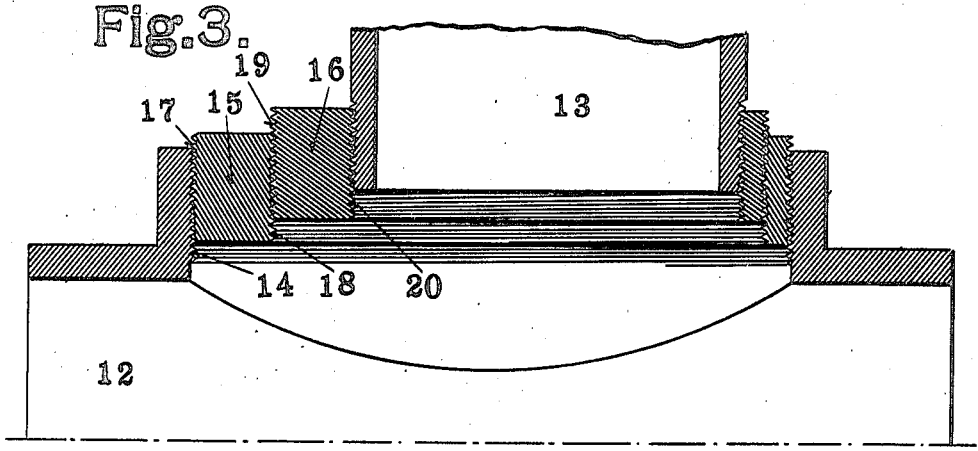
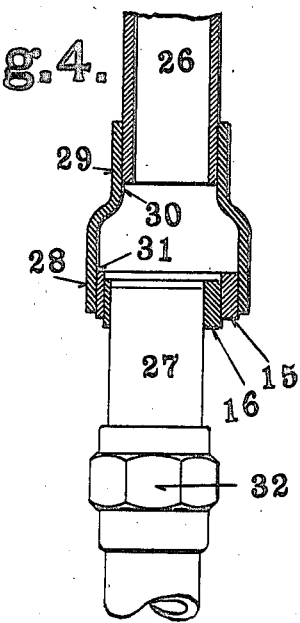
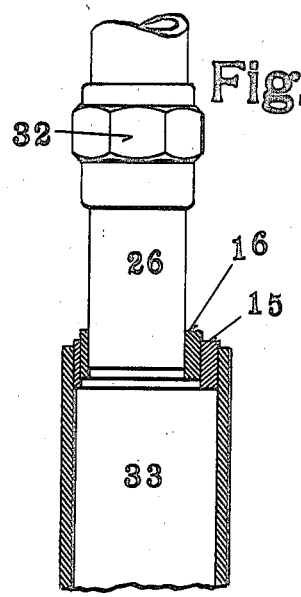
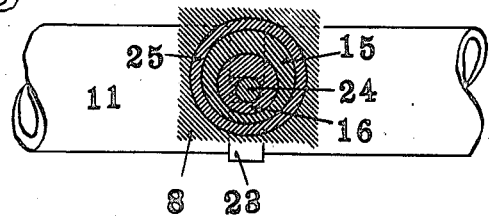
WITNESS
W. H. Alexander
INVENTOR.
J. Hirshstein
BY
ATTORNEY.

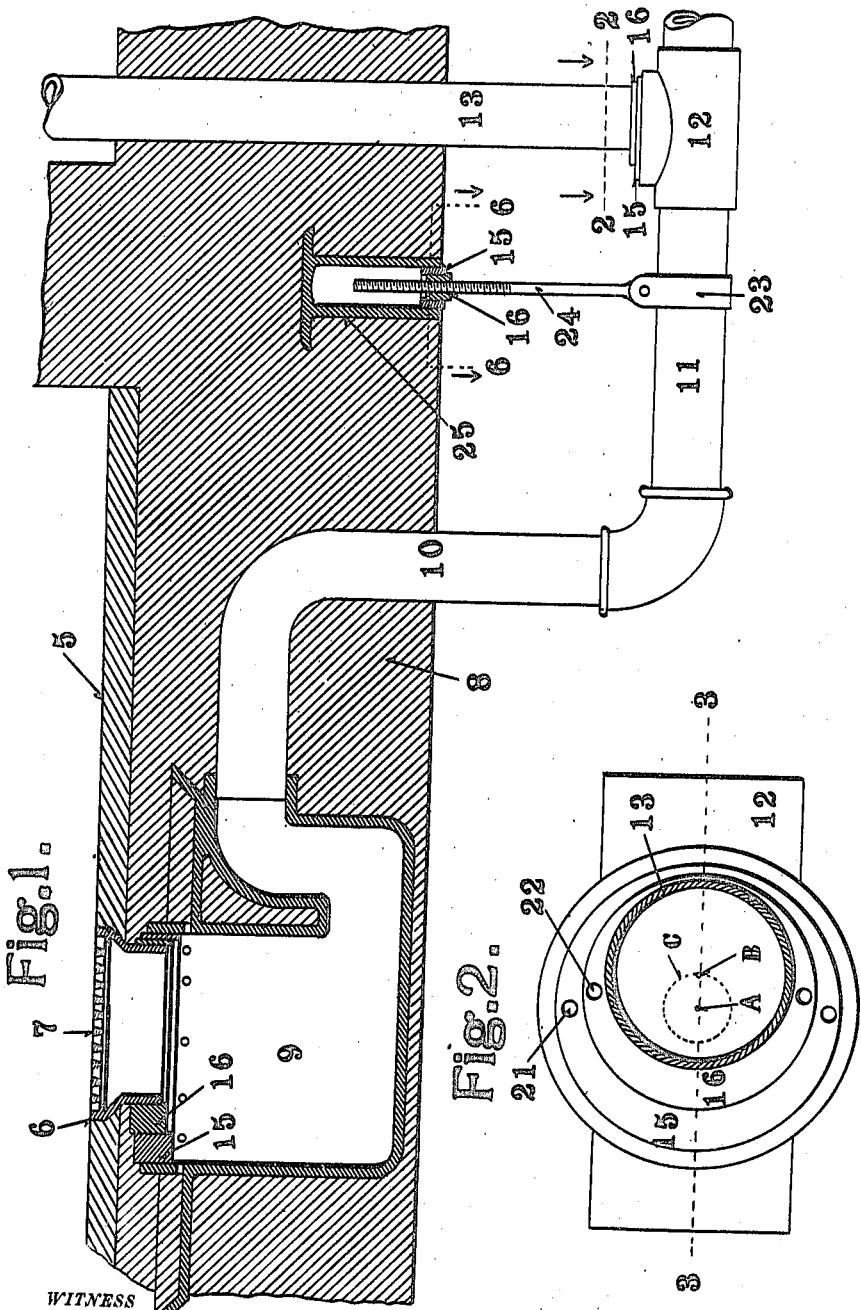

UNITED STATES PATENT OFFICE.

JOSEPH HIRSHSTEIN, OF ST. LOUIS, MISSOURI.

COUPLING.

1,304,979.   Specification of Letters Patent.   Patented May 27, 1919.

Application filed January 22, 1918. Serial No. 213,115.

*To all whom it may concern:*

Be it known that I, JOSEPH HIRSHSTEIN, a citizen of the United States of America, residing at the city of St. Louis, State of Missouri, United States of America, have invented a certain new and useful Coupling, of which the following is such a full, clear, and exact description as will enable any one skilled in the art to which it appertains to make and use the same, reference being had to the accompanying drawings, forming part of this specification.

My invention relates to coupling means for making connections between pipes and other devices in situations where the parts are not in such alinement as to permit the use of standard couplings. Under such conditions it has heretofore been customary either to provide one of the pipes with a double bend, or to provide some form of offset, but since the extent of bend on the offset must be exactly equal to the amount of eccentricity of the two parts to be connected, which eccentricity varies, considerable difficulty is often experienced and expense incurred in making connections in this way. It is the object of my invention to provide a simple and efficient form of connector, which forms in effect a variable offset which may be readily adjusted to connect parts which are in true concentric alinement or are eccentric to any degree which is likely to be found in practice.

The accompanying drawings illustrate one embodiment of my invention, Figure 1 showing applications of the coupling; Fig. 2 an enlarged horizontal section taken on the line 2—2 of Fig. 1; Fig. 3 an enlarged section taken on the line 3—3 of Fig. 2; Fig. 4 illustrates an application of my invention to the coupling of two pipes of equal diameter end to end; Fig. 5 illustrates a similar application to two pipes of unequal diameter; and Fig. 6 is an enlarged section taken on the line 6—6 of Fig. 1.

5 represents a floor slab of marble or similar material having an opening 6 adapted to receive a cover 7 of a drain. Embedded in the floor 8, below the slab 5, is a combined drain and trap 9. Leading from the drain 9 is a pipe 10 which is in turn connected with a horizontal pipe 11. The pipe 11 is connected to a vertical pipe 13 by the T 12. This vertical pipe extends through the floor 8, and it often happens in practice that the end of the vertical pipe 13 is not in true alinement with the opening in the T 12. This is one example of conditions to which my invention is applicable.

In the form shown my improved coupler comprises a pair of connecting members 15 and 16, the outer connecting member being provided with an outer threaded face 17 and an inner threaded face 18, eccentrically arranged with respect to each other. The inner connecting member 16 is provided with an outer threaded face 19 and an inner threaded face 20, also eccentric to each other. The outer threaded face 19 is of the proper size to screw into the opening 18 of the outer member, while the inner face engages with threads on pipe 13. The outer face 17 is of proper size to screw into the opening 14 in the T 12. In order to rotate the members 15 and 16, I form in their faces openings 21 and 22 respectively for engagement with spanners. It will be evident that by arranging the connecting members 15 and 16, as shown in Fig. 2 of the drawings, the pipe engaging opening 20 will be moved into eccentric relation with the surface 17 engaging with the opening 14 in the T 12. By rotating the inner member 16 through an arc of 180° it will be evident that as the eccentricity of the two members 15 and 16 is the same, one will neutralize the other; in other words, the center of the opening 20 will be brought into coincidence with the point A indicating the center of the face 17. By moving the member 16 into intermediate positions the eccentricity may be varied from zero to the amount indicated by the distance A—B in Fig. 2. Therefore, the center of the opening 20 may be brought to any point within the dotted circle C of Fig. 2, and consequently the pipe 13 may be connected to the T 12 under any condition in which the eccentricity does not exceed the amount indicated by the circle. By making the combined eccentricity of the two members 15 and 16 sufficient to cover the amount of error liable to occur under practical conditions, it will be possible to connect the pipes 11 and 12 in all cases.

It often happens that the opening 6 of the slab 5, which opening is formed in the slab before it is placed in position, does not aline with the opening in the drain 9 on account of the drain not having been placed at the exact point contemplated in the plans. Such a condition is shown in the drawings, and is overcome in the same manner as above described. The opening in the drain being larger than the drain cover, the two members 15 and 16 are interposed between the cover and the drain in the same manner as has been heretofore described in connection with the pipe 13 and the T 12.

The invention may also be applied to the means for supporting the horizontal pipe 11. In supporting this pipe I place around the same a strap 23 which engages with a rod or bolt 24. The rod or bolt 24 enters an insert 25 set in the floor 8. In place, however, of engaging directly with the insert, the two connecting members 15 and 16 are interposed between the insert and the rod. By the use of the connecting members 15 and 16 the rod 24 may be brought directly over the center line of the pipe 11, when the center of the insert 25 lies at one side of said line, as is clearly shown in Fig. 6 of the drawings.

In the application of my invention hereinbefore described one of the parts to be connected has been provided with an opening of considerably greater diameter than the external diameter of the other part, so that the connectors 15 and 16 can be directly interposed between the two parts to be connected. In Fig. 4 of the drawings I have shown an application of my invention in which the pipes 26 and 27 to be connected are of the same diameter. Consequently it will be necessary to use in addition to the connecting members 15 and 16 a third connecting member 28. This connecting member 28 is provided with a reduced portion 29 having an internally threaded opening 30 of the proper diameter to receive the external threads of pipe 26. The body of the part 28 is provided with an external opening 31 of sufficient diameter to receive the external face 17 of the member 15. In order to allow the rotation of the pipe 27 in connecting the parts, I prefer to provide said pipe with a union 32 of any usual form. The manner of using this form of connection is the same as that hereinbefore described.

In Fig. 5 I have shown a further application of my invention in the connection of the two pipes end to end. In this application the pipe 33 to be connected to the pipe 26 is sufficiently large to receive the external face 17 of the member 15, and consequently the member 28 is omitted.

Having fully described my invention, what I claim as new and desire to secure by Letters Patent of the United States is:

1. A coupling for connecting non-alined parts, comprising two coupling members having connected surfaces relatively rotatable, said surfaces having interlocking connections preventing accidental longitudinal movement, each of said members being provided with a second connecting surface eccentric to the center of relative rotation of said members.

2. A coupling for connecting non-alined parts, comprising two coupling members having threaded connecting surfaces relatively rotatable, each of said members being provided with a second connecting surface eccentric to the center of relative rotation of said members.

3. A coupling for connecting non-alined parts, comprising two coupling members having connected surfaces relatively rotatable, said surfaces having interlocking connections preventing accidental longitudinal movement, each of said members being provided with a second connecting surface eccentric to the center of relative rotation of said members, one of said second surfaces being threaded.

4. A coupling for connecting non-alined parts, comprising two coupling members, each provided with a threaded surface adapted to engage with the other, each of said members being also provided with a second threaded surface eccentric to the center of relative rotation of said members.

5. In a coupling, the combination of a pair of coöperating connecting members, each provided with two bearing faces eccentrically arranged with respect to each other, the extent of eccentricity of the two bearing faces being the same in each member whereby they may be adjusted to connect either alined or non-alined parts.

6. A coupling for connecting non-alined parts, comprising two coupling members having threaded contact surfaces relatively rotatable, each of said members being provided with a second contact surface eccentric to the center of relative rotation of said members, one of said members being provided with tool engaging means whereby it may be rotated.

7. A coupling for connecting non-alined parts, comprising two coupling members having threaded contact surfaces relatively rotatable, each of said members being provided with a second contact surface eccentric to the center of relative rotation of said members, both of said members being provided with tool engaging means whereby they may be rotated.

8. A coupling for non-alined parts, comprising two coupling members having engaging surfaces relatively rotatable, each of said members being provided with a second engaging surface eccentric to the center of relative rotation of said members, and a third coupling member engaging with one of said first named members and with one of the members to be coupled.

9. A coupling for non-alined parts, comprising two coupling members having engaging surfaces relatively rotatable, each of said members being provided with an engaging surface eccentric to the center of relative rotation of said members, and a third coupling member engaging with one of said first named members and provided with a reduced portion for engagement with one of the members to be coupled.

In testimony whereof I have hereunto set my hand and affixed my seal.

JOSEPH HIRSHSTEIN. [L. S.]